United States Patent
Yang et al.

(10) Patent No.: US 12,007,553 B1
(45) Date of Patent: Jun. 11, 2024

(54) ANTI-PEEPING ASSEMBLY AND ANTI-PEEPING DISPLAY DEVICE

(71) Applicant: HKC CORPORATION LIMITED, Shenzhen (CN)

(72) Inventors: Xiaohui Yang, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/356,431

(22) Filed: Jul. 21, 2023

(30) Foreign Application Priority Data

Nov. 30, 2022 (CN) .......................... 202211515354.0

(51) Int. Cl.
| | |
|---|---|
| G02B 26/08 | (2006.01) |
| G02F 1/13 | (2006.01) |
| G02F 1/1335 | (2006.01) |
| H01F 7/126 | (2006.01) |
| H01F 7/16 | (2006.01) |

(52) U.S. Cl.
CPC ........... *G02B 26/08* (2013.01); *G02F 1/1323* (2013.01); *G02F 1/133514* (2013.01); *H01F 7/126* (2013.01); *H01F 7/1646* (2013.01); *H01F 2007/1692* (2013.01)

(58) Field of Classification Search
CPC .... G02F 1/0036; G02F 1/0072; G02F 1/0128; G02F 1/091; G02F 3/022
See application file for complete search history.

(56) References Cited

U.S. PATENT DOCUMENTS

| | | | | |
|---|---|---|---|---|
| 2016/0341954 | A1* | 11/2016 | Wang | ...................... G06F 3/017 |
| 2019/0170962 | A1* | 6/2019 | Lin | ...................... G06F 21/6245 |

FOREIGN PATENT DOCUMENTS

| | | |
|---|---|---|
| CN | 104090377 A | 10/2014 |
| CN | 104090378 A | 10/2014 |
| CN | 109541831 A | 3/2019 |
| CN | 109946868 A | 6/2019 |

(Continued)

OTHER PUBLICATIONS

Office Action dated Feb. 3, 2023, in corresponding Chinese Application No. 202211515354.0, 17 pages.

(Continued)

*Primary Examiner* — Lauren Nguyen
(74) *Attorney, Agent, or Firm* — Maier & Maier, PLLC

(57) ABSTRACT

An anti-peeping assembly and an anti-peeping display device. The anti-peeping assembly includes an anti-peeping component, two frames arranged at a periphery of the anti-peeping component, and two drive modules. The anti-peeping component includes two first substrates and a louver layer sandwiched between the two first substrates. The louver layer includes a plurality of light transmitting parts and a plurality of shading parts adjacent to the plurality of light transmitting parts. The drive module is configured to drive at least one of the two first substrates to move relative to the louver layer in a thickness direction of the first substrates so as to cause the louver layer to be compressed or be recovered from deformation, thereby realizing adjustment of a dimension of each of the light transmitting parts in the thickness direction. The anti-peeping assembly solves a problem that the conventional anti-peeping assembly has fixed and non-adjustable visual angle.

20 Claims, 5 Drawing Sheets

(56) References Cited

FOREIGN PATENT DOCUMENTS

| | | |
|---|---|---|
| CN | 210072116 U | 2/2020 |
| CN | 110989266 A | 4/2020 |
| CN | 113611811 A | 11/2021 |
| CN | 115327811 A | 11/2022 |
| CN | 115657349 A | 1/2023 |
| JP | 2011013904 A | 1/2011 |
| JP | 2012230219 A | 11/2012 |

OTHER PUBLICATIONS

Notification to Grant Patent Right for Invention dated Feb. 16, 2023, in corresponding Chinese Application No. 202211515354.0, 3 pages.

\* cited by examiner

ANTI-PEEPING ASSEMBLY AND ANTI-PEEPING DISPLAY DEVICE

CROSS-REFERENCE TO RELATED APPLICATION

Pursuant to 35 U.S.C. § 119 and the Paris Convention, this application claims the benefit of Chinese Patent Application No. 202211515354.0 filed on Nov. 30, 2022, the entire content of which is incorporated herein by reference.

TECHNICAL FIELD

The present application relates to the field of display technologies, and more particularly, to an anti-peeping assembly and an anti-peeping display device.

BACKGROUND

Display technologies are commonly used in the market, people's requirements in various aspects of display technologies, such as pixel resolution, response time, screen size, etc., have already been satisfied. However, under some special display environments, a screen needs to be only visible to a user of the screen and is invisible to others, the screen is provided with an anti-peeping display mode.

A louver structure is applied to a louver layer of an anti-peeping display device used for display screen products in the related art. When a visual angle of the conventional anti-peeping display device needs to be changed, a new louver structure of the louver layer needs to be redesigned and assembled, modification and manufacturing processes are complicated and costly.

SUMMARY

An anti-peeping assembly and an anti-peeping display device are provided in the embodiments of the present application; a plurality of drive modules drive two first substrates to make a relative movement in a thickness direction of the two first substrates, and the louver layer sandwiched between the two first substrates is elastically deformed, a change of a height and a size of each light transmitting part is caused, and a visual angle of light passing through the light transmitting part is adjusted accordingly. The anti-peeping assembly is applied to different usage scenarios to solve a problem that the visual angle of the conventional anti-peeping assembly is fixed and non-adjustable.

An anti-peeping assembly is provided in the embodiments of the present application, the anti-peeping assembly includes an anti-peeping component, two frames arranged on a periphery of the anti-peeping component, and a plurality of drive modules. The anti-peeping component includes two first substrates, and a louver layer sandwiched between the two first substrates. The louver layer includes a plurality of light transmitting parts and a plurality of shading parts arranged to be adjacent to the plurality of light transmitting parts. Each drive module is used to drive at least one of the two first substrates to move relative to the louver layer in a thickness direction of the two first substrates in order to cause the louver layer to be compressed or restored from deformation, thereby realizing adjustment of a dimension of each light transmitting part in the thickness direction.

In some embodiments, each of the drive modules includes a first magnetic component and a second magnetic component, the first magnetic component is arranged between the two first substrates, and is configured to apply a magnetic force to the two first substrates to cause the two first substrates to be closer to each other, in order to compress the louver layer. The second magnetic component is arranged between the two first substrates and configured to apply a magnetic force to the two first substrates to cause the two first substrates to move away from each other, in order to recover the louver layer from deformation.

In some embodiments, the first magnetic component includes two permanent magnets having different magnetic properties, and the two permanent magnets are arranged on two side surfaces of the two first substrates adjacent to the two first substrates, respectively;

In some embodiments, the second magnetic component includes two electromagnets having the same magnetic property, and a drive circuit electrically connected to the two electromagnets. The two electromagnets are respectively arranged on the two side surfaces of the two first substrates adjacent to the two electromagnets. The drive circuit is configured to control values of input currents of coils of the two electromagnets.

In some embodiments, the two electromagnets are embedded in the two permanent magnets, respectively.

In some embodiments, a number of the shading parts is plural, and a plurality of the shading parts are arranged to be spaced from each other in a direction perpendicular to the thickness direction, and one of the light transmitting parts is arranged between every two adjacent shading parts.

In some embodiments, each of the plurality of shading part has a strip-shaped structure, and the plurality of shading parts are arranged in a direction perpendicular to the length direction; or alternatively, each of the plurality of shading parts has a circular structure, and the plurality of shading parts are arranged in a radial direction thereof.

In some embodiments, the louver layer has a mesh structure, and comprises a plurality of intersecting blocking strips and meshes enclosed by the plurality of blocking strips; the plurality of blocking strips are the shading parts, and the meshes are the light transmitting parts.

In some embodiments, the two frames are glue frames, and inner walls of the two frames are fixed with the two first substrates, respectively;

In some embodiments, two surfaces of each frame in the thickness direction of the first substrate are respectively flush with two surfaces of the first substrate being adjacent to the frame and being away from the louver layer.

The anti-peeping display device provided in the embodiment of the present application has the following beneficial effects: compared with the prior art, in the present application, each drive module is used to drive the two first substrates to move relative to the louver layer in the thickness direction of the two first substrates, in order to cause the louver layer to be compressed or restored from deformation, thereby realizing adjustment of the dimension of each light transmitting part in the thickness direction. When light passes through louver layers having different sizes, the visual angle of the light passing through each light transmitting part may be adjusted. Due to this arrangement, the anti-peeping assembly may realize customization of the visual angle according to user requirement without changing the structure thereof, and requirements of different users are satisfied. The anti-peeping assembly may be applied to different display panels and has a wide market application scope.

An anti-peeping display device is further provided in the embodiments of the present application, the anti-peeping display device includes a display panel and an anti-peeping assembly described in the aforesaid embodiment, and is arranged on a light-exiting surface of the display panel.

The anti-peeping display device provided in the embodiments of the present application has the following beneficial effects: the aforesaid anti-peeping assembly is used in the anti-peeping display device. In the present application, each drive module is used to drive the two first substrates to move relative to the louver layer in the thickness direction of the two first substrates, in order to cause the louver layer to be compressed or restored from deformation, thereby realizing adjustment of the dimension of each light transmitting part in the thickness direction. When light passes through louver layers having different sizes, the visual angle of the light passing through each light transmitting part may be adjusted. Due to this arrangement, the anti-peeping assembly may realize customization of the visual angle according to user requirement without changing the structure thereof, requirements of different users are satisfied. The anti-peeping assembly may be applied to different display panels and has a wide market application scope.

In some embodiments, the display panel includes a color film substrate, a liquid crystal layer, and an array substrate, which are arranged to be laminated. The color film substrate includes a second substrate, and the second substrate and one of the two first substrates are integrally formed.

BRIEF DESCRIPTION OF DRAWINGS

In order to describe the embodiments of the present application more clearly, a brief introduction regarding the accompanying drawings that need to be used for describing the embodiments of the present application or the prior art is given below; it is apparent that the accompanying drawings described below are merely some embodiments of the present application, a person of ordinary skill in the art may also acquire other drawings according to the current drawings without paying creative efforts.

DETAILED DESCRIPTION OF EMBODIMENTS

The technical solutions in the embodiments of the present invention will be described clearly and comprehensively with reference to accompanying drawings in the embodiments. It is obvious that, the embodiments described below are only some embodiments of the present invention rather than the entirety of the embodiments. Based on the embodiments in the present invention, some other embodiments, which are obtained by the person of ordinary skill in the art without paying creative labor, are all included in the protection scope of the present application.

In the description of the present application, it needs to be understood that, directions or location relationships represented by terms such as "center", "up", "down", "front", "rear", "left", "right", "vertical", "horizontal", "top", "bottom", "inside", "outside", etc., are the directions or location relationships shown in the accompanying figures, and are only intended to describe the present application conveniently and are for the purpose of conciseness of the description, but should not be interpreted as indicating or implying that a device or a component indicated by the terms must have specific locations and be constructed and manipulated according to the specific locations. Therefore, these terms shouldn't be considered as limitation to the present application.

In the description of the present application, it needs to be noted that, unless there is additional explicit stipulation and limitation, terms of "mount", "connect with", "connect" should be generalizedly interpreted. For example, "connect" may be interpreted as being fixedly connected, being detachably connected, or being connected integrally. A person of ordinary skill in the art may interpret the specific meanings of the aforesaid terms in the present application according to specific conditions.

In addition, terms "the first" and "the second" are only for description purposes, and should not be considered as indicating or implying any relative importance, or implicitly indicating the number of indicated technical features. As such, technical feature(s) restricted by "the first" or "the second" can explicitly or implicitly include one or more such technical feature(s). In the description of the present application, "a plurality of" has the meaning of two or more, unless said "a plurality of" is additionally interpreted.

Figure 1:
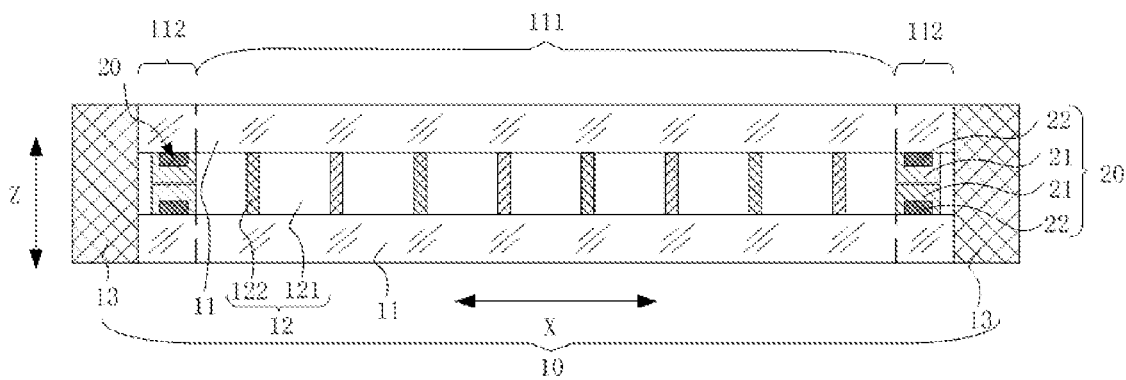
FIG. 1 illustrates a schematic cross-sectional diagram of an anti-peeping assembly in the first embodiment of the present application.
Figure 2:
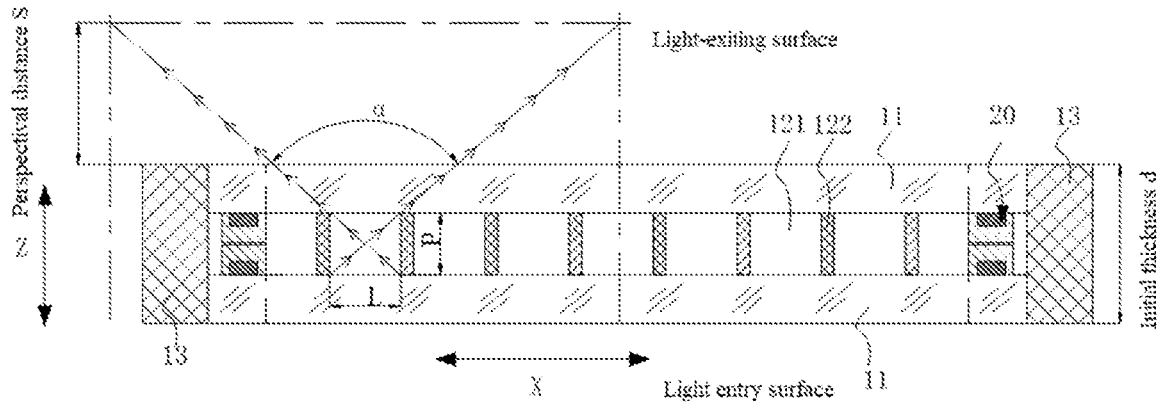
FIG. 2 illustrates a schematic cross-sectional diagram of the anti-peeping assembly in one visual angle, as shown in FIG. 1.
Figure 3:
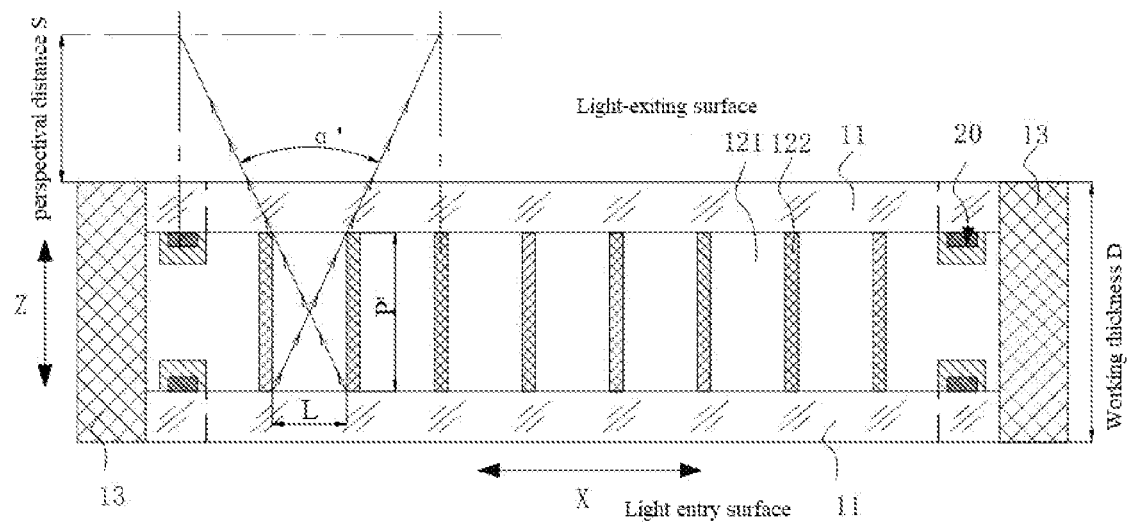
FIG. 3 illustrates a schematic cross-sectional diagram of the anti-peeping assembly in another visual angle, as shown in FIG. 1.

As shown in FIGS. 1, 2, and 3, an anti-peeping assembly 30 is provided in the present application. The anti-peeping assembly 30 includes an anti-peeping component 10, two frames 13 arranged on a periphery of the anti-peeping component 10, and a plurality of drive modules 20. The anti-peeping component 10 includes two first substrates 11, and a louver layer 12 sandwiched between the two first substrates 11. The louver layer 12 includes a plurality of light transmitting parts 121 and a plurality of shading parts 122 adjacent to the plurality of light transmitting parts 121, light entering the louver layer 12 from the first substrates 11 is blocked by the shading parts 122, and may only pass through the light transmitting parts 121, such that a user can be allowed to clearly see a screen content only when he/she is within the visual angle range. Each drive module 20 is used to drive one of the two first substrates 11 to move relative to the louver layer 12 in a thickness direction Z of the first substrates 11. In other words, one of the two first substrates 11 is fixedly arranged, when the drive module 20 drives the other first substrate 11 to move in a direction of approaching the louver layer 12, the louver layer 12 is compressed, which leads to a decrease in the size of each light transmitting part 121 in the thickness direction Z. When the drive module 20 drives the other first substrate 11 to move away from the louver layer 12, the louver layer 12 is gradually recovered from deformation, thus adjusting the size of each light transmitting part 121 in the thickness direction Z. Alternatively, the drive module 20 is used to drive the two first substrates 11 to move relative to the louver layer 12 in the thickness direction Z of the first substrates 11, which means that the drive module 20 is used to drive the two first substrates 11 to move in the direction of approaching the louver layer 12 simultaneously, thus causing the louver layer 12 to be compressed, such that the size of each light transmitting part 121 in the thickness direction Z is reduced. The louver layer 12 is recovered from deformation when the two first substrates 11 are driven to move away from the louver layer 12. In this way, the size of each light transmitting part 121 in the thickness direction Z is adjusted, and the visual angle of light passing through the light transmitting part 121 is adjusted accordingly.

The anti-peeping assembly 30 provided in the first embodiment of the present application has the following beneficial effects: compared with the prior art, in the present application, the two first substrates 11 are driven by the drive module 20 to move relative to the louver layer 12 in the thickness direction Z thereof, thus causing the louver layer 12 to be compressed or be recovered from deformation, and thereby adjusting the size of each light transmitting part 121 in the thickness direction Z. When light passes through the louver layer 12 having different sizes, the visual angle of the light passing through each light transmitting part 121 can be adjusted. Thus, the anti-peeping assembly 30 can realize customization of the visual angle according to user requirement without changing the structure thereof, the requirements of different users are satisfied. The anti-peeping assembly 30 may be applied to different display panels 40, has a wide market application scope.

The first substrates 11 are usually made of a transparent material which allows light to pass through. The first substrates 11 may be made of glass. Due to high refractive index and high Abbe number, good transparency of the glass, the glass has excellent display effect. Moreover, the glass has low cost and is prone to be processed, and thus the control of the production cost of the first substrates 11 is facilitated. Thus, no matter whether one first substrate 11 moves relative to the louver layer 12 or two first substrates 11 move relative to the louver layer 12 simultaneously, optical properties of the first substrates 11 including refractive index and transmittance do not change, thus, it is ensured that the anti-peeping assembly 30 has excellent display performance.

In some embodiments, one of the two first substrates 11 of the anti-peeping component 10 is made of glass, and the other first substrate 11 is made of heat cured resin or ultraviolet (UV) cured resin. In this condition, the first substrate 11 made of resin is fixed on the light-exiting surface of the display panel 40, due to this arrangement, the connection between the first substrate 11 and the display panel 40 is reliable and deformation is minimized. The first substrate 11 made of glass is used as the first substrate 11 that can move relative to the louver layer 12, thus, the anti-peeping assembly 30 has excellent display effect.

In addition, the thicknesses of the two first substrates 11 may be the same or be different, and are not particularly limited herein.

Explosion-proof film or other functional film layers may also be arranged on one side of the first substrate 11 to provide the anti-peeping assembly 30 with an explosion-proof function and other functions corresponding to the functional film layer, which are not particularly limited herein.

It should be noted that the visual angle refers to an angle from which the user can observe all contents on the screen clearly from different directions. The visual angle includes a horizontal visual angle and a vertical visual angle. The horizontal visual angle is based on a vertical normal of the display (i.e. the vertical imaginary line in the middle of the display), and a displayed image can still be seen normally at a certain angle perpendicular to the normal at left or at right. This angle range is the horizontal visual angle of the LCD display. Similarly, if the horizontal normal is used as the reference, the visible angle from top to bottom is referred to as the vertical visible angle. The visual angle that usually refers to without an explicitly statement is the horizontal visual angle. In addition, due to the uniform arrangement of the light transmitting part 121 and the shading part 122 of the louver layer 12, the visual angle of the anti-peeping assembly 30 refers to the visual angle of the light passing through the light transmitting part 121 between two adjacent shading parts 122 of the louver layer 12, as shown in FIG. 2.

As shown in FIG. 2 and FIG. 3, in some embodiments, the two frames 13 are rubber frames, and inner walls of the two frames 13 are fixed to the two first substrates 11, respectively.

Each frame 13 is made of adhesive, thus, the frame 13 is provided with elasticity. Therefore, when one first substrate 11 moves in the thickness direction Z thereof relative to the louver layer 12, the frame 13 may be deformed in the thickness direction Z of the first substrate 11, which means that the frame 13 is compressed or recovered from deformation along with the louver layer 12 simultaneously. In this way, not only the connection between the two frames 13 and the two first substrates 11 is maintained, the sealing between the louver layer 12 and the two first substrates 11 is ensured, the entire internal system is isolated from the outside, dust is blocked from entering the display assembly to affect the display effect. Moreover, it is more conducive to adjust the size of the louver layer 12 in the thickness direction Z of the first substrate 11, thereby adjusting the visual angle. In addition, the rubber frames are directly fixed and sealed with the peripheries of the two first substrates 11, the number of components is reduced, the structure of the anti-peeping assembly 30 is improved, and cost control is facilitated.

In some embodiments, the glue frame, as the name suggests, refers to the frame 13 made of glue. The main function of the frames 13 is to ensure that the upper and lower first substrates 11 in the anti-peeping component 10 can be firmly adhered together, and serve for fixedly connecting and sealing the two first substrates 11. In addition to the glue frame for sealing, the frame 13 may also be made of cured resin, and the inner walls of the frame 13 are respectively fixed to the two first substrates 11 by bonding.

In some embodiments, the frames 13 may also be made of rubber material.

The frames 13 may be fixed together with the two first substrates 11 using adhesive or double-sided adhesive, which is cost-effective and conducive to mass production.

As shown in FIGS. 2 and 3, in some embodiments, two surfaces of one frame 13 in the thickness direction Z of the first substrate 11 are flush with the surfaces of the adjacent first substrate 11 away from the louver layer 12, respectively. Due to this arrangement, the flatness and aesthetic appearance of the anti-peeping assembly 30 are improved.

In order to improve a roundness of an outer edge of the frame 13 located on the light-exiting surface of the anti-peeping assembly 30, one of the outer edges of the frame 13 in the thickness direction Z of the first substrate 11 may be designed as a rounded corner. Due to this arrangement, when the anti-peeping assembly 30 is attached to the light-exiting surface of the display panel 40, one side surface of the rounded corner is located on the side away from the display panel 40 to enable the overall appearance of the anti-peeping assembly 30 to be more rounded. It is beneficial for improving user experience. As an alternative, according to a practical requirement, the outer edges of the two surfaces of the frame 13 in the thickness direction Z of the first substrate 11 may be designed as rounded corners. The outer edges of the two surfaces of the frame 13 are not particularly limited herein.

As shown in FIG. 1, in some embodiments, each drive module 20 includes: a first magnetic component and a second magnetic component. The first magnetic component is arranged between the two first substrates 11 and is configured to apply magnetic force for bringing the two first substrates 11 closer to each other to compress the louver layer 12. The second magnetic component is arranged between the two first substrates 11 and is configured to apply a magnetic force to the two first substrates 11 to cause the two first substrates 11 to move away from each other, in order to recover the louver layer 12 from deformation.

As shown in FIG. 1, the first substrate 11 includes one display area 111 and two peripheral areas 112 located on the periphery of the display area 111. The drive module 20 is arranged between the two first substrates 11 and is located within one peripheral area 112. Due to this arrangement, it is beneficial for improving the display effect.

As shown in FIGS. 1 to 3, in some embodiments, the first magnetic component includes two permanent magnets 21 having different magnetic properties, and the two permanent magnets 21 are arranged on the two adjacent surfaces of the two first substrates 11, respectively. Due to this arrangement, the structure is simple, the cost is low, and it is convenient to achieve the movement of the first substrate 11 towards the louver layer 12 to cause the louver layer 12 to be compressed.

Two permanent magnets 21 are respectively located in one periphery area 112 between the two first substrates 11, thus, the display area 111 of the anti-peeping assembly 30 is increased, which is conducive to improving the display effect. In particular, two permanent magnets 21 having different magnetic properties may be arranged in the periphery area 112 between the two first substrates 11 by bonding or through other fixing methods.

The number of first magnetic components may be two or plural. When the number of the first magnetic components is two, the two first magnetic components are arranged on the left and right sides of the two first substrates 11 in a horizontal direction X perpendicular to the thickness direction Z, as shown in FIG. 1. Due to this arrangement, the two first magnetic components which are symmetrically arranged can effectively avoid the first substrate 11 from being tilted when the first substrate 11 moves relative to the louver layer 12 under the drive force of the drive module 20, the levelness of the first substrate 11 is ensured, which is beneficial for improving the display effect.

In some embodiments, when the size of the first substrate 11 is relatively large, a plurality of first magnetic components may also be arranged at the edges between the two first substrates 11. Each of the plurality of first magnetic components has the same magnetic force, and the sum of the magnetic forces of the plurality of first magnetic components is invariable. This arrangement further avoids the first substrate 11 from being tilted when the first substrate 11 moves in the thickness direction Z, and further improves the display effect.

The first magnetic component not only includes two permanent magnets 21 having different magnetic properties, but also include two structures made of magnetic materials having different magnetic properties, the structure of the first magnetic component is not particularly limited herein.

As shown in FIGS. 1 to 3, in some embodiments, the second magnetic component includes two electromagnets 22 having the same magnetic property, and a drive circuit electrically connected to the two electromagnets 22. The two electromagnets 22 are respectively and oppositely arranged on the adjacent surfaces of the two first substrates 11, and the drive circuit is configured to control input currents of coils of the two electromagnets 22. Due to the positive correlation between the magnetic force of the electromagnets 22 and the input currents, the magnetic force of the second magnetic component may be adjusted by controlling the input currents of the coils of the two electromagnets 22 through the drive circuit, the louver layer 12 is enabled to be at different heights, and a desired visual angle for the user is obtained accordingly.

It should be noted that the number of the second magnetic components is the same as the number of the first magnetic components, and the first magnetic components are arranged to correspond to the second magnetic components, which can further improve the display effect.

As shown in FIG. 1, in some embodiments, each electromagnet 22 is embedded in the corresponding permanent magnet 21. Due to this arrangement, when the electromagnet 22 is energized and operated, two permanent magnets 21 having different magnetic properties are located within the magnetic field generated by the electromagnets 22, which is beneficial for counteracting the magnetic force of the permanent magnet 21. In some embodiments, in addition to being embedded in the permanent magnets 21, the electromagnets 22 may also be arranged on the two surfaces of the two first substrates 11 that are opposite to each other. The electromagnets 22 and the permanent magnets 21 may be arranged adjacent to each other or at intervals; however, the spacing between one electromagnet 22 and one permanent magnet 21 should not be too large.

In particular, a movement process of the anti-peeping assembly 30 is as follows:

As shown in FIG. 2, in the initial state, the two first substrates 11 approach each other under the magnetic force of two permanent magnets 21, until the two permanent magnets 21 engage with each other. In this condition, the louver layer 12 is compressed, and the size of the light transmitting part 121 of the louver layer 12 in the thickness direction Z of the first substrate 11 is the smallest, that is, the height of the light transmitting part 121 as shown in FIG. 2 is P, and the opening size of the light transmitting part 121 is L as shown in FIG. 2, the visual angle is calculated. It should be noted that, in this condition, the louver layer 12 has the deformation being within the maximum compressive deformation. Otherwise, the louver layer 12 will experience elastic failure and cannot recover from deformation.

As shown in FIG. 3, when the electromagnets 22 start to be energized and operated, the louver layer 12 gradually recovers from deformation in the thickness direction Z of the first substrate 11 when the electromagnet 22 drive the first substrates 11 to move away from the louver layer 12, until the height of the light transmitting part 121 of the louver layer is P'. Since the width of the light transmitting part 121 of the louver layer 12 is much smaller than the height of the light transmitting part 121, when the height of the light transmitting part 121 changes, the opening size of the light transmitting part 121 is L as shown in FIG. 3. Due to the small size of the light blocking part 122 in the horizontal direction X as shown in FIG. 3, when the height of the light transmitting part 121 changes, the width deformation of the opening size of the light transmitting part 121 as shown in FIG. 3 can be ignored, the width of the opening size is still L, which indicates the visual angle in this condition.

As stated above, the visual angle is directly proportional to the height of the light transmitting part 121, the height of the light transmitting part 121 is equal to the height of the louver and the distance between the two first substrates 11. That is to say, the visual angle may be adjusted by adjusting the height of the light transmitting part 121.

Louver layers 12 having different heights may be designed by a user according to the requirement, the visual angle is adjusted through the first magnetic component and the second magnetic component, customization of the visual angle is realized.

As shown in FIGS. 4 to 8, in some embodiments, the number of the shading parts 122 is plural, and the plurality of shading parts 122 are arranged at intervals in a direction perpendicular to the thickness direction Z, and one light transmitting part 121 is arranged between every two adjacent shading parts 122.

Figure 4:
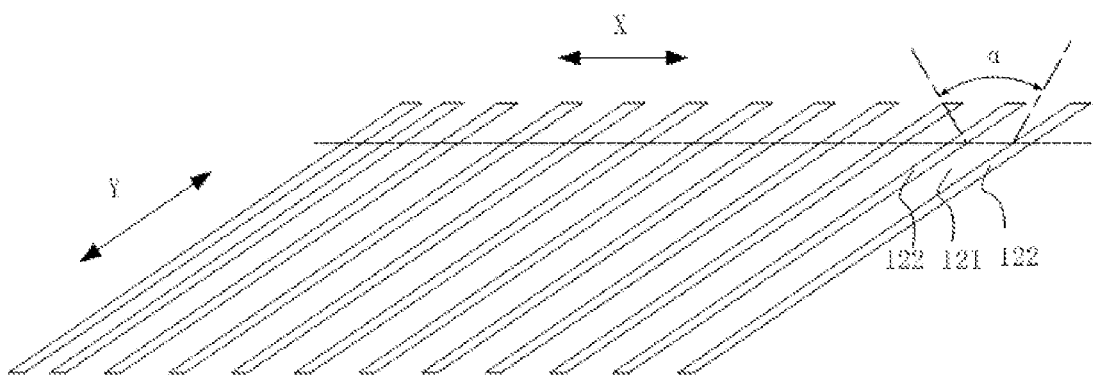
FIG. 4 illustrates a simplified stereoscopic diagram of a louver layer with stripe-shaped shading parts in some embodiments of the present application.
Figure 5:
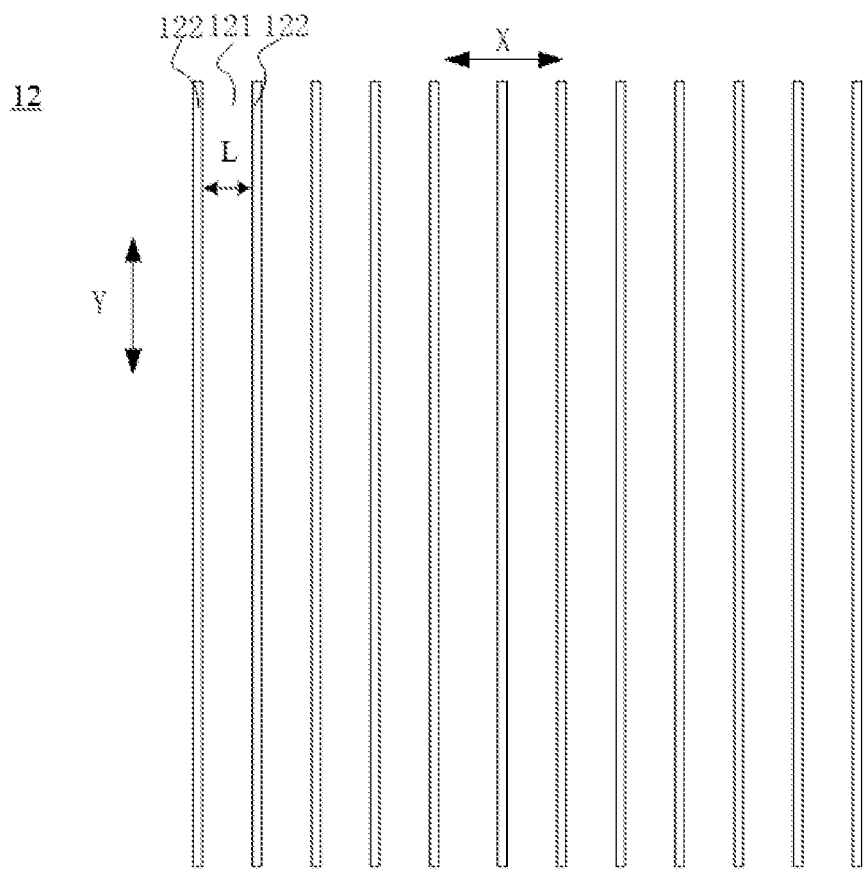
FIG. 5 illustrates a top view of the louver layer of FIG. 4.

As shown in FIGS. 4 and 5, in some embodiments, the shading parts 122 are strip-shaped structures, and the plurality of shading parts 122 are arranged in a direction X perpendicular to the length direction Y of the shading part 122, that is, the shading part 122 is arranged in a horizontal direction X as shown in FIG. 4. Due to this arrangement, when the anti-peeping assembly 30 is arranged on the light-exiting surface of the display panel 40, anti-peeping in the arrangement direction X of the shading parts 122, that is, the horizontal direction X as shown in FIG. 5, is realized. Certainly, the louver layer 12 may also be rotated 90° to turn the horizontal direction X and vertical direction Y as shown in FIG. 5, that is, the strip-shaped shading parts 122 are horizontally arranged, which is suitable for the light-exiting surface of the display panel 40 that needs to be in a vertical direction, it is used for selecting a main direction of anti-peeping function as required for such as a screen of an electronic terminal device (e.g., a mobile phone). Generally, the anti-peeping in the horizontal direction X is required, that is, the louver layer 12 shown in FIG. 5 is used. Anti-peeping in the horizontal direction X or anti-peeping in the vertical direction Y may be selected according to the actual application scenario, and is not particularly limited herein.

Figure 6:
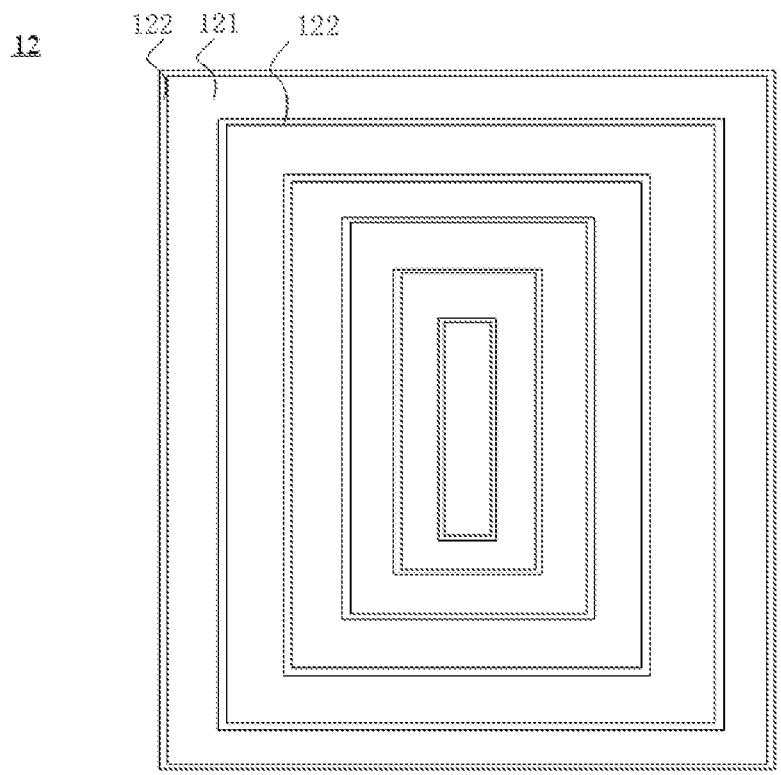
FIG. 6 illustrates a top view of a louver layer having the shading parts in a mouth-shaped annular structure in some embodiments of the present application.
Figure 7:
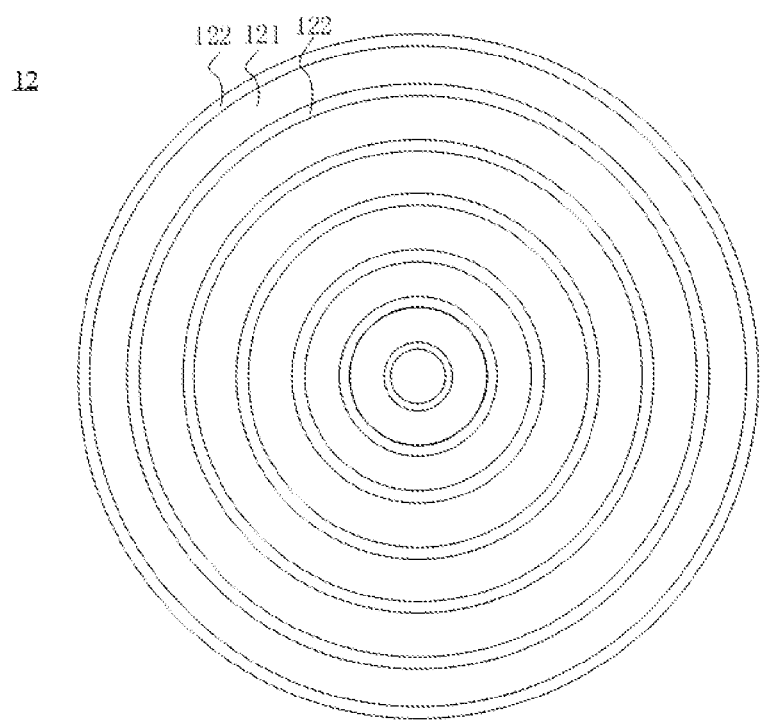
FIG. 7 illustrates a top view of a louver layer having the shading parts in a circular annular structure in some embodiments of the present application.

As shown in FIGS. 6 and 7, in some embodiments, each shading part 122 is a circular structure, and the plurality of shading parts 122 are arranged in a radial direction thereof. Due to this arrangement, the anti-peeping effect around the screen may be achieved, and the anti-peeping effect is much better.

It should be noted that the circular structure includes ring-shaped structures and hollow square structures. The specific shape of the circular structure and the structure of the shading parts 122 of the louver layer 12 may be selected and designed based on the actual screen shape and size, which are not particularly limited herein.

Figure 8:
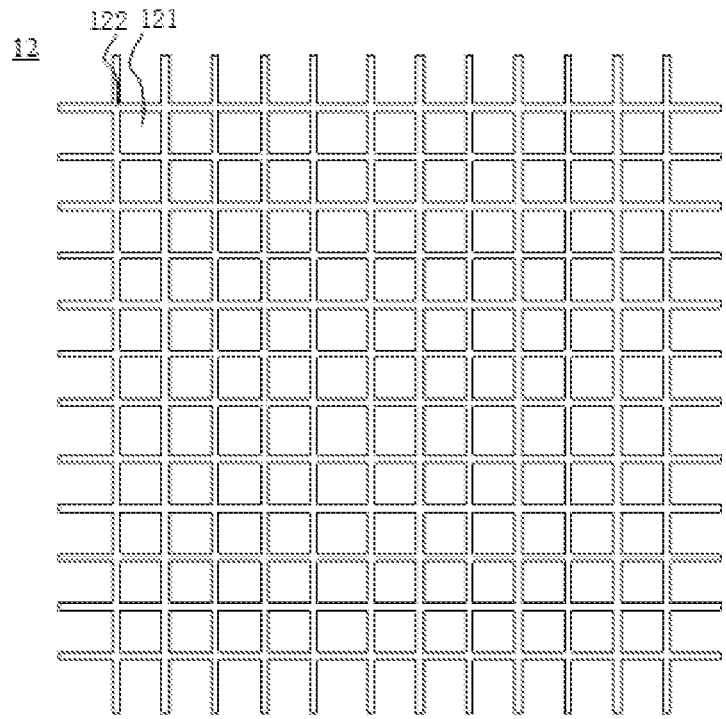
FIG. 8 illustrates a top view of the louver layer having a mesh structure in some embodiments of the present application.

As shown in FIG. 8, in some embodiments, the louver layer 12 has a mesh structure and includes a plurality of intersecting blocking strips and meshes enclosed by the plurality of blocking strips. The blocking strips are the shading parts 122, and the meshes are the light transmitting parts 121. The louver layer 12 is designed as a mesh shape which is beneficial for surrounding anti-peeping and improving the anti-peeping effect. The mesh-shaped louver layer 12 is suitable for special occasions which have high requirements for anti-peeping effect, especially in the environments which have high confidentiality requirements.

Figure 9:
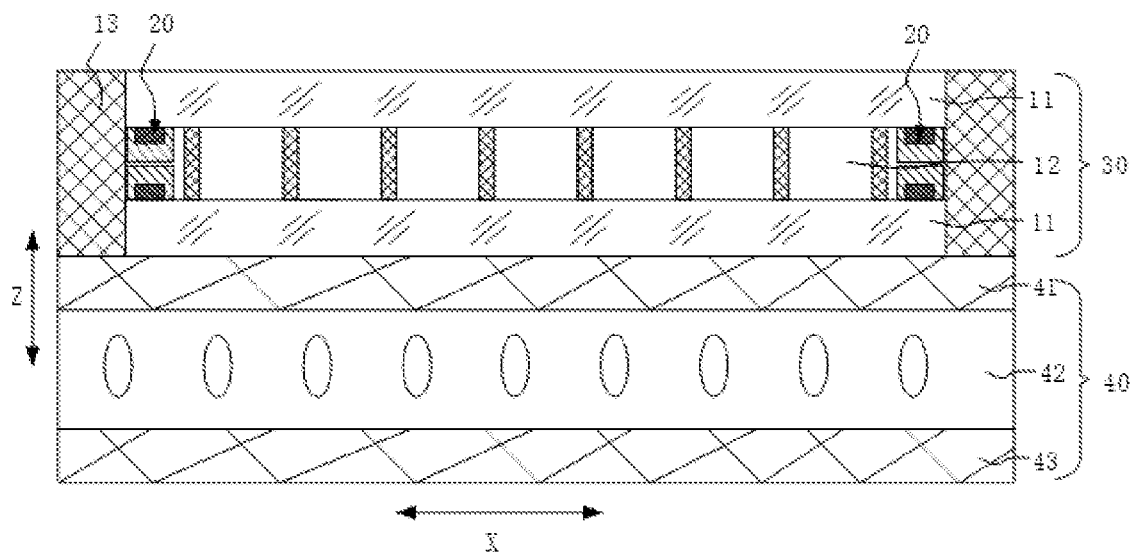
FIG. 9 illustrates a schematic cross-sectional diagram of the anti-peeping display device in the second embodiment of the present application.

As shown in FIG. 9, an anti-peeping display device is further provided in the present application. The anti-peeping display device includes a display panel 40 and an anti-peeping assembly 30 as described in the first embodiment. The anti-peeping assembly 30 is arranged on the light-exiting surface of the display panel 40.

The detailed structure of the anti-peeping assembly 30 included in the anti-peeping display device of the second embodiment of the present application may be referred to the aforesaid first embodiment, and will not be repeatedly described here. It can be understood that due to the use of the aforementioned anti-peeping assembly 30 in the anti-peeping display device of the present application, the embodiments of the anti-peeping display device of the present application include all technical solutions of all embodiments of the aforesaid anti-peeping assembly 30, and can achieve the technical effects achieved by the aforesaid technical solutions.

As shown in FIG. 9, in particular, the display panel 40 includes a color film substrate 41, a liquid crystal layer 42 and an array substrate 43, which are arranged to be laminated. One of the two first substrates 11 in the anti-peeping assembly 30 of the first embodiment, that is, the lower first substrate 11 shown in FIG. 9, is attached to one side of the color film substrate 41 away from the liquid crystal layer 42.

In some embodiments, the display panel 40 further includes two polarizers (not shown in the figures), the polarizer located on the light-exiting surface may be arranged between the color film substrate 41 and the adjacent first substrate 11 (i.e., the lower first substrate 11 as shown in FIG. 1), or be arranged on the first substrate 11 away from the color film substrate 41 in the anti-peeping assembly 30, that is, the upper first substrate 11 as shown in FIG. 9. The arrangement of the polarizers is not particularly limited herein. The arrangement of the position of the other polarizer corresponding to the polarizer on the light-exiting surface can refer to the related art, and will not be repeatedly described herein.

Figure 10:
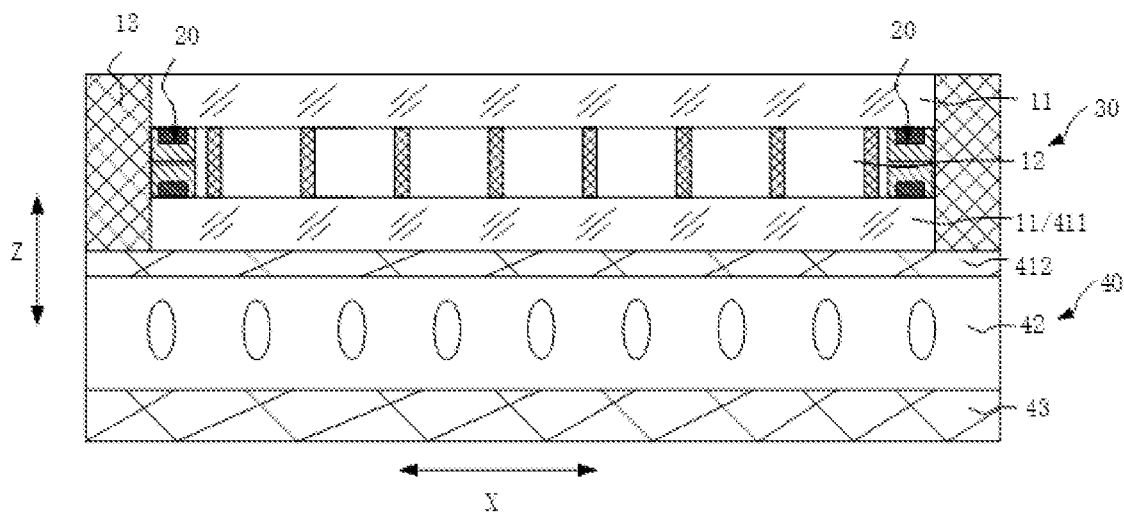
FIG. 10 illustrates a schematic cross-sectional diagram of the anti-peeping display device in the third embodiment of the present application.

As shown in FIG. 10, an anti-peeping display device is provided in the present application. The anti-peeping display device includes a display panel 40 and an anti-peeping assembly 30 as described in the aforesaid embodiment. The anti-peeping display device as shown in FIG. 10 differs from the anti-peeping display device as shown in FIG. 9 in that a connection mode between the display panel 40 and the first substrates 11 of the anti-peeping display device shown in FIG. 10 is different from that of anti-peeping display device shown in FIG. 9. In the anti-peeping display device shown in FIG. 10, the color film substrate 41 includes a second substrate 411 and a common electrode layer 412, and the second substrate 411 and one of the two first substrates 11 are integrally formed.

The structure of the display panel 40 shown in FIG. 10 is also different from that of the display panel 40 shown in FIG. 9. In the anti-peeping display device shown in FIG. 9, the first substrate 11 is directly connected to the color film substrate 41 of the display panel 40. In the anti-peeping display device shown in FIG. 10, the second substrate 411 of the color film substrate 41 is shared with one of the two first substrates 11 of the anti-peeping assembly 30, which means that when manufacturing the display panel 40, the second substrate 411 of the color film substrate 41 and one of the two first substrates 11 in the anti-peeping assembly 30 may be integrally formed directly, functions of the second substrate 411 and one first substrate 11 are integrated on one single substrate, the total thickness of the anti-peeping display device is reduced by a thickness of one substrate, the design of thin and lightweight of the thickness of the anti-peeping display device is facilitated.

In some embodiments, the polarizer (not shown in the figures) located on the light-exiting surface of the display panel 40 may be directly arranged on the first substrate 11 of the anti-peeping assembly 30 away from the color film substrate 41 (i.e., the upper first substrate 11 as shown in FIG. 10), to facilitate the arrangement of the polarizer. The arrangement of the other polarizer (not shown in the figures) corresponding to the polarizer arranged on the light-exiting surface can refer to the related art, and will not be repeatedly described herein.

It should be noted that, for clarity and unambiguity of illustration, the thicknesses of the various components in the first embodiment, the second embodiment and the third embodiment shown in FIGS. 1 to 10 are only illustrative, the specific thickness and dimensions of the components are determined according to the actual requirement, the thicknesses of the various components are not particularly limited herein.

In the description of the specification, specific features, structures, materials, or features may be combined in an appropriate manner in any one or more embodiments or examples.

The aforesaid embodiments are only some specific embodiments of the present application. However, the protection scope of the present application is not limited by these embodiments. Changes or replacements, which can be easily thought out by a skilled person in the art who is familiar with the technical field of the present application, should all be included in the protection scope of the present application. Thus, the protection scope of the present application should be determined by the protection scope of the claims.

What is claimed is:

1. An anti-peeping assembly applied to a display panel, the anti-peeping assembly comprising an anti-peeping component and two frames arranged on a periphery of the anti-peeping component, the anti-peeping component comprising two first substrates and a louver layer sandwiched between the two first substrates; the louver layer comprising a plurality of light transmitting parts and a plurality of shading parts arranged to be adjacent to the plurality of light transmitting parts; and the anti-peeping assembly further comprises a plurality of drive modules configured to drive at least one of the first substrates to move relative to the louver layer in a thickness direction of the first substrates to cause the louver layer to be compressed or be recovered from deformation, thereby adjusting a dimension of each light transmitting part in the thickness direction; and each of the drive modules comprises:

a first magnetic component arranged between the two first substrates and configured to apply a magnetic force to the two first substrates to cause the two first substrates to be closer to each other, in order to compress the louver layer;

a second magnetic component arranged between the two first substrates and configured to apply a magnetic force to the two first substrates to cause the two first substrates to move away from each other, in order to recover the louver layer from deformation.

2. The anti-peeping assembly according to claim 1, wherein, the first magnetic component comprises two permanent magnets having different magnetic properties, and the two permanent magnets are arranged on two side surfaces of the two first substrates adjacent to the two first substrates, respectively.

3. The anti-peeping assembly according to claim 2, wherein, the two electromagnets are embedded in the two permanent magnets, respectively.

4. The anti-peeping assembly according to claim 1, wherein, a number of the shading parts is plural, and a plurality of the shading parts are arranged to be spaced from each other in a direction perpendicular to the thickness direction, and one of the light transmitting parts is arranged between every two adjacent shading parts.

5. The anti-peeping assembly according to claim 4, wherein, each of the plurality of shading parts has a strip-shaped structure, and the plurality of shading parts are arranged in a direction perpendicular to the length direction.

6. The anti-peeping assembly according to claim 1, wherein, the louver layer has a mesh structure and comprises a plurality of intersecting blocking strips and meshes enclosed by the plurality of blocking strips, the plurality of blocking strips are the shading parts, and the meshes are the light transmitting parts.

7. The anti-peeping assembly according to claim 1, wherein, the two frames are glue frames, and inner walls of the two frames are fixed with the two first substrates, respectively.

8. An anti-peeping display device, comprising:

a display panel; and the anti-peeping assembly according to claim 1, wherein the anti-peeping assembly is arranged on a light-exiting surface of the display panel.

9. The anti-peeping display device according to claim 8, wherein the display panel comprises a color film substrate, a liquid crystal layer, and an array substrate, which are arranged to be laminated; the color film substrate comprises a second substrate, and the second substrate and one of the two first substrates are integrally formed.

10. The anti-peeping display device according to claim 8, wherein the first magnetic component comprises two permanent magnets having different magnetic properties, and the two permanent magnets are arranged on two side surfaces of the two first substrates adjacent to the two first substrates, respectively.

11. The anti-peeping display device according to claim 8, wherein the second magnetic component comprises two electromagnets having the same magnetic property, and a drive circuit electrically connected to the two electromagnets; the two electromagnets are respectively arranged on the two side surfaces of the two first substrates adjacent to the two electromagnets, and the drive circuit is configured to control values of input currents of coils of the two electromagnets.

12. The anti-peeping display device according to claim 11, wherein the two electromagnets are embedded in the two permanent magnets, respectively.

13. The anti-peeping display device according to claim 8, wherein a number of the shading parts is plural, and a plurality of the shading parts are arranged to be spaced from each other in a direction perpendicular to the thickness direction, and one of the light transmitting parts is arranged between every two adjacent shading parts.

14. The anti-peeping display device according to claim 8, wherein each of the plurality of shading parts has a strip-shaped structure, and the plurality of shading parts are arranged in a direction perpendicular to the length direction.

15. The anti-peeping display device according to claim 8, wherein each of the plurality of shading parts has a circular structure, and the plurality of shading parts are arranged in a radial direction thereof.

16. The anti-peeping display device according to claim 8, wherein the louver layer has a mesh structure, and comprises a plurality of intersecting blocking strips and meshes enclosed by the plurality of blocking strips, the plurality of blocking strips are the shading parts, and the meshes are the light transmitting parts.

17. The anti-peeping display device according to claim 8, wherein the two frames are glue frames, and inner walls of the two frames are fixed with the two first substrates, respectively.

18. The anti-peeping display device according to claim 8, wherein two surfaces of each frame in the thickness direction of the first substrate are respectively flush with two surfaces of the first substrate being adjacent to the frame and being away from the louver layer.

19. The anti-peeping assembly according to claim 1, wherein the second magnetic component comprises two electromagnets having the same magnetic property, and a drive circuit electrically connected to the two electromagnets; the two electromagnets are respectively arranged on the two side surfaces of the two first substrates adjacent to the two electromagnets, and the drive circuit is configured to control values of input currents of coils of the two electromagnets.

20. The anti-peeping assembly according to claim 5, wherein each of the plurality of shading parts has a circular structure, and the plurality of shading parts are arranged in a radial direction thereof.

\* \* \* \* \*